Figure 4:
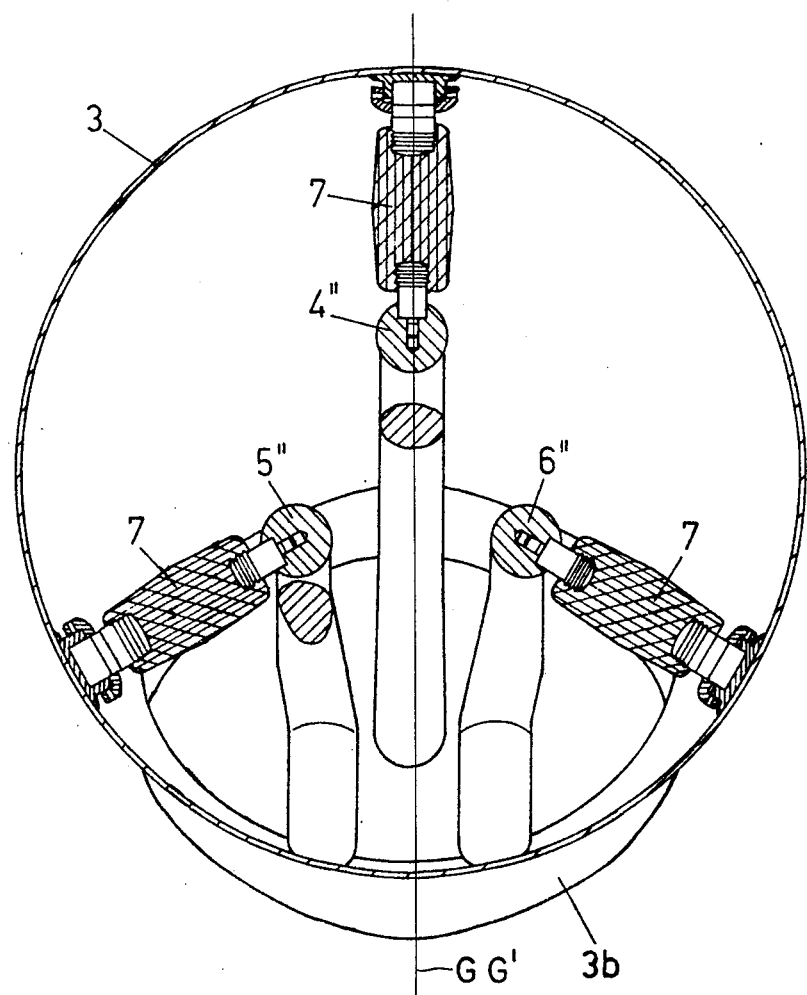

United States Patent [19]

Floessel

[11] 4,059,723

[45] Nov. 22, 1977

[54] APPARATUS FOR CHANGING THE DIRECTION OF A THREE-PHASE PIPE-TYPE GAS-PRESSURIZED ELECTRICAL CABLE

[75] Inventor: Carl Dieter Floessel, Fislisbach, Switzerland

[73] Assignee: BBC Brown Boveri & Company Limited, Baden, Switzerland

[21] Appl. No.: 643,114

[22] Filed: Dec. 22, 1975

[30] Foreign Application Priority Data

Jan. 10, 1975  Switzerland .................... 275/75

[51] Int. Cl.² ..................... H01B 9/00; H02G 15/08
[52] U.S. Cl. ................. 174/21 R; 174/16 B; 174/27; 174/87
[58] Field of Search ............ 174/21 R, 21 C, 21 CA, 174/21 JS, 27, 28, 29, 16 B, 99 B, 87, 71 R

[56] References Cited

U.S. PATENT DOCUMENTS

| 3,391,243 | 7/1968 | Whitehead ................. 174/21 R |
| 3,546,356 | 12/1970 | Graybill et al. ............ 174/21 C |
| 3,585,271 | 6/1971 | Reynolds et al. ......... 174/21 CA X |
| 3,792,187 | 2/1974 | Depcrymski ................ 174/21 C |
| 3,823,249 | 7/1974 | Floessel et al. ............ 174/21 C |
| 3,919,456 | 11/1975 | Floessel .................... 174/27 |
| 3,931,451 | 1/1976 | Durschner et al. ......... 174/28 X |

Primary Examiner—Arthur T. Grimley
Attorney, Agent, or Firm—Pierce, Scheffler & Parker

[57] ABSTRACT

A direction-changing arrangement for a three-phase pipe-type gas-pressurized electrical cable constituted principally by rigid straight pipe lengths connected in series and wherein the axes of the three phase conductors supported within the pipe when viewed in cross-section form a triangle. The desired change in direction is accomplished by interposing a spherical elbow pipe between two straight pipe lengths which includes a pair of branch pipe stubs connected to the ends of the adjoining straight pipe lengths, and three curved conductor members supported within the elbow and arranged symmetrically to the plane formed by the respective axes of the two branch pipe stubs which intersect at the center of the elbow. Three intermediate conductor sections are provided and these serve to interconnect the ends of the three inner conductors within the adjoining straight pipe lengths with the ends of the three curved conductor members within the elbow.

3 Claims, 7 Drawing Figures

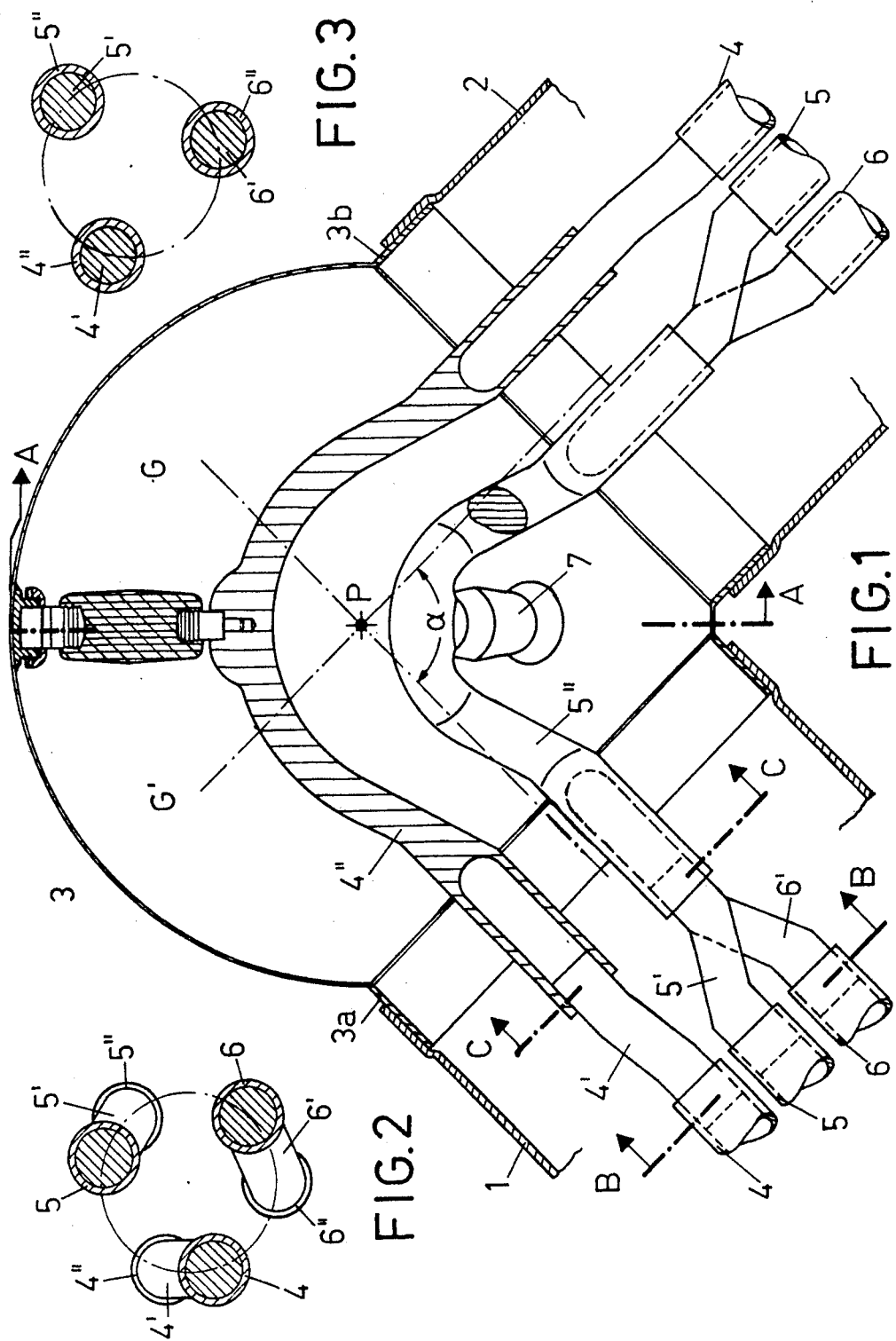

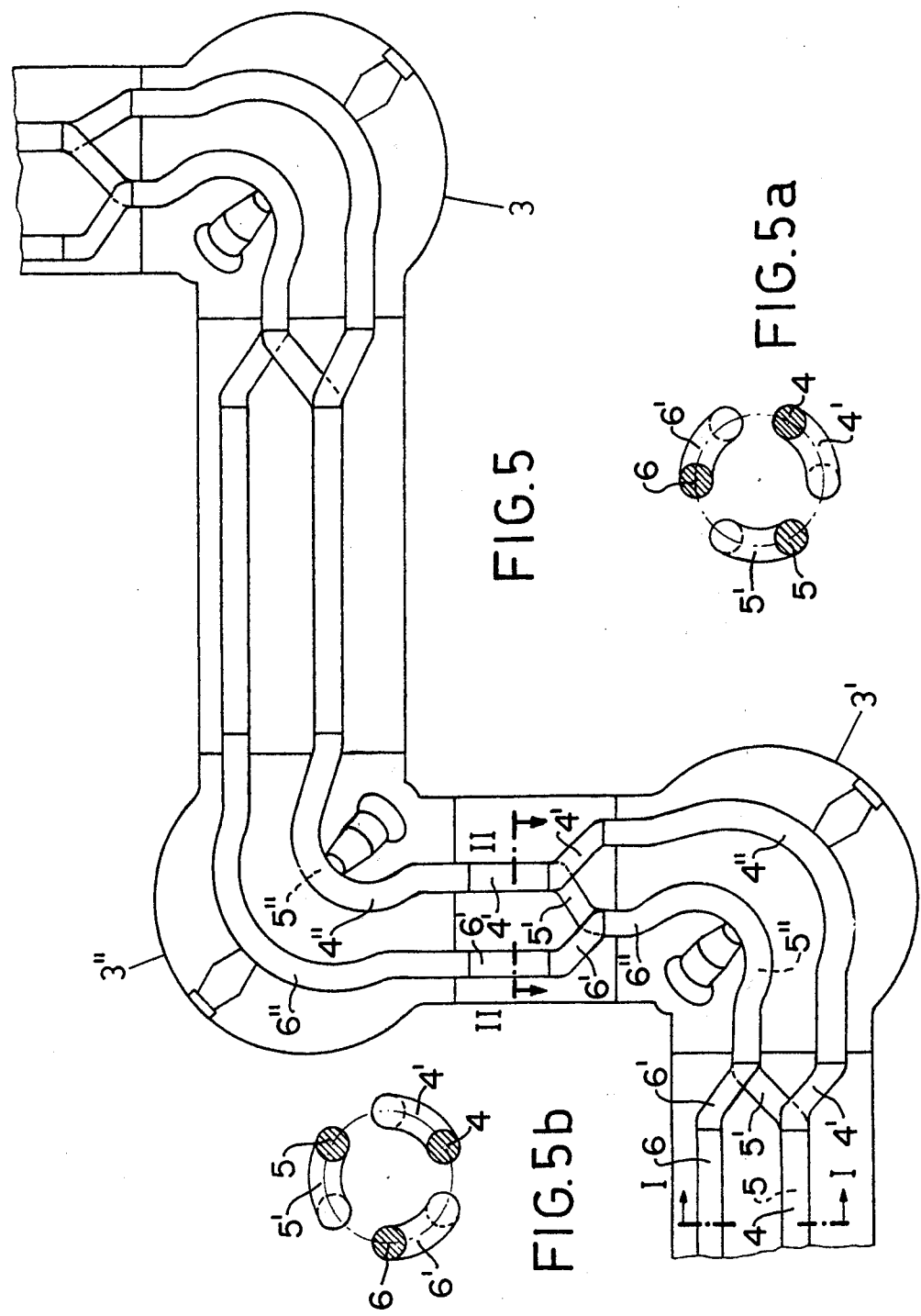

APPARATUS FOR CHANGING THE DIRECTION OF A THREE-PHASE PIPE-TYPE GAS-PRESSURIZED ELECTRICAL CABLE

This invention concerns an improvement in apparatus for changing the direction of a three-phase, pipe-type, gas-pressurized cable the axes of whose inner conductors, when viewed in cross-section, form a triangle.

Known proposals for pipe-type gas-pressurized cables include locating the three inner conductors within a common, earthed metal pipe enclosure. Insulated support for the inner conductors consists of post insulators of various shapes, the inside of the pipe enclosure being filled with compressed $SF_6$ gas. When laying pipe-type gas-pressurized cables one attempts to arrange the cable in a straight run. However, since this is not always possible, owing to local circumstances, devices are required which allow deviation from a straight run. It has already been proposed that the pipe-type cable should include an intermediate section, the enclosure portion of which is in the form of a ball joint and the inner conductors of which incorporate a flexible part. This arrangement, however, allows only a relatively small variation of angle of about ±5°.

The object of the invention is to create apparatus for changing direction with which, in addition to making extensive use of standard components, the angle of the cable run can be varied by up to somewhat more than a right angle in any desired direction. The apparatus of the invention has the following features:

a. the apparatus comprises as its enclosure portion for a predetermined change of angle a standard spherical elbow piece with branches for connecting the straight lengths of pipe-type cable, b. the three curved portions of the inner conductors in the standard elbow piece are arranged symmetrically to the plane formed by the two branch axes intersecting at the centre of the spherical elbow, c. intermediate sections are provided which allow the spatial position of the inner conductors in the straight lengths of cable to be adapted to that of the curved portions in the standard elbow piece.

An example of the invention is illustrated in the drawings, in which:

FIG. 1 shows a plan view of a section through a standard elbow piece for a right-angled change of direction, FIGS. 2 and 3 show cross-sections at the lines B—B and C—C, from which the spatial position of the inner conductors at the respective places can be seen, FIG. 4 shows a section through the standard elbow piece at line A—A of FIG. 1, FIG. 5 shows a stepwise arrangement of a pipe-type gas-pressurized cable using three standard elbow pieces, and FIGS. 5a and 5b are sectional diagrams indicating the position and adaptation of the inner conductors at sections I—I and II—II in the pipe-type cable.

In the figures, corresponding parts are identified by the same symbols. In FIG. 1 the straight portions of the pipe enclosure of the cable are denoted 1 and 2. In the example shown the spherical housing 3 of the standard elbow piece is dimensioned for a change of direction of 90°. It includes branches 3a, 3b in the form of stub pipes with which it forms a gastight joint with portions 1, 2, e.g. by welding. The straight inner conductors 4, 5, 6 in the straight portions 1, 2 of the enclosure are electrically connected to the curved portions 4", 5", 6" via angled intermediate pieces 4', 5', 6' and retained in the housing 3 by means of post insulators 7. As is evident from the drawings the straight inner conductors 4, 5, and 6 are arranged in an axis-parallel manner within and parallel to the axis of the straight portions 1, 2 respectively of the pipe enclosure and have a spatial configuration such that the respective axes of the conductors coincide with respective junction points of the sides of an equilateral triangle, and this same spatial relationship is essentially maintained by the conductors at all points along the path through the elbow. The curved portions 4", 5", 6" are arranged in the standard elbow piece symmetrically to the plane formed by the intersecting straight lines G, G', as shown in FIG. 1. The lines G, G' are the axes of the branches 3a, 3b, which intersect at the center of the sphere P. The curved portion 4", which has the largest radius of curvature, then lies preferably in the plane G, G', as this yields favourable dielectric conditions in the pipe-type cable. The other two curved portions 5" and 6" having a smaller radius of curvature are located at equal distances on each side of said plane, all as depicted in FIG. 4. The standard elbow piece shown in the figures can also be made for another angle of directional variation. The form of the intermediate sections 4', 5', 6' is then altered only if appropriate. These serve as means of adapting the respective positions of the inner conductors 4, 5, 6 in the straight lengths of pipe 1 and 2 to the curved portions 4", 5", 6". The spatial orientation of the system of inner conductors in the straight part of the cable can alter, depending on the arrangement of the cable run, and at the junction with the standard elbow piece is corrected if necessary by the intermediate sections 4', 5', 6' before the curved portions 4", 5", 6". FIG. 5, 5a and 5b show an example of a stepwise, vertical arrangement of the cable using three standrd elbow pieces 3. In this embodiment, it is seen that within the lower elbow 3' the arrangement of the three conductors is the same as in the elbow 3 of FIG. 1, i.e., the curved portion 4" of conductor 4 has the larger curvature and the curved portions 5", 6" of conductors 5 and 6 have the same but smaller curvature. Within the upper elbow 3", the curved portion 6" of conductor 6 has the larger curvature and the curved portions 4", 5" of conductors 4 and 5 have the same but a smaller curvature.

The advantage of the new apparatus is that three-phase gas-pressurized cables in a pipe enclosure can be laid using standard elbow pieces for a given change of angle. With this construction only simple intermediate sections are required for the inner conductors.

I claim:

1. In a three-phase pipe-type gas-pressurized electrical cable constituted principally by rigid straight pipe lengths connected in series and wherein the axes of the three phase conductors supported within the pipe when viewed in cross-section form an equilateral triangle, the improvement wherein means are provided for changing the direction of the cable, said direction-changing means comprising a spherical elbow interposed between two straight pipe lengths, said elbow including a pair of branch pipe stubs connected to the ends of the adjoining straight pipe lengths and three curved conductor members supported in spaced relation within said elbow, one of said curved conductor members and which has the largest radius of curvature being located in a plane formed by the respective axes of said two branch pipe stubs which intersect at the center of said elbow and the other two curved conductor members having a smaller radius of curvature being located at equal distances on each side of said plane, and three intermedite conductor sections connecting and adapting the respective positions of the ends of the three conductors supported within the adjoining pipe lengths to their correlated conductor members within said elbow.

2. A three-phase pipe-type gas-pressurized electrical cable as defined in claim 1 wherein the respective axes of the two branch pipe stubs intersect at the center of said elbow at an angle of 90°.

3. A three-phase pipe-type gas-pressurized electrical cable as defined in claim 1 and wherein at least one post type insulator is provided for supporting each curved conductor member within said elbow.

* * * * *